United States Patent
Yang et al.

(10) Patent No.: US 6,295,217 B1
(45) Date of Patent: Sep. 25, 2001

(54) LOW POWER DISSIPATION POWER SUPPLY AND CONTROLLER

(75) Inventors: Min-Sung Yang, Seoul (KR); Timothy Allen Pletcher, Eastampton; Robert Amantea, Manalapan, both of NJ (US); Jae-Young Choi, Seoul (KR); Joo-Dong Yu; Jae-Hwan So, both of Kyunngi-Do (KR)

(73) Assignees: Sarnoff Corporation, Princeton, NJ (US); Daewoo Electronics Co. Ltd., Seoul (KR)

( * ) Notice: Subject to any disclaimer, the term of this patent is extended or adjusted under 35 U.S.C. 154(b) by 0 days.

(21) Appl. No.: 09/502,654

(22) Filed: Feb. 11, 2000

Related U.S. Application Data

(60) Provisional application No. 60/126,525, filed on Mar. 26, 1999.

(51) Int. Cl.[7] .................................................. H02M 1/12
(52) U.S. Cl. ............................. 363/49; 363/21.1; 363/97
(58) Field of Search ............................... 363/15, 16, 20, 363/21, 74, 78, 79, 80, 95, 97, 131, 49; 323/901

(56) References Cited

U.S. PATENT DOCUMENTS

| | | | |
|---|---|---|---|
| 4,937,728 | * 6/1990 | Leonardi | 363/49 |
| 5,452,195 | * 9/1995 | Lehr et al. | 363/21 |
| 5,459,652 | * 10/1995 | Faulk | 323/21 |
| 5,528,132 | 6/1996 | Doluca. | |
| 5,742,494 | * 4/1998 | Brakus et al. | 363/41 |

FOREIGN PATENT DOCUMENTS

| | | |
|---|---|---|
| 4105464A1 | 10/1991 | (DE). |
| 0 436 515 A2 | 7/1991 | (EP). |
| 0 538 038 A1 | 2/1994 | (EP). |
| 59132774 | 7/1984 | (JP). |
| 63305754 | 12/1988 | (JP). |
| WO 99/05777 | 2/1999 | (WO). |

OTHER PUBLICATIONS

International Search Report for PCT/US00/08064, filed Mar. 3, 2000.

* cited by examiner

Primary Examiner—Peter S. Wong
Assistant Examiner—Gary L. Laxton
(74) Attorney, Agent, or Firm—William J. Burke

(57) ABSTRACT

An exemplary power supply provides low power dissipation in standby mode by disabling the start-up circuit and by implementing variable frequency operation independent of the feedback signal. A standby mode detection circuit automatically implements the variable frequency operation, and an under voltage lockout signal implements the start-up circuit disable. Once the start time expires or when feedback control enables, the start-up circuit is disabled so that it dissipates negligible power. A voltage controlled oscillator responsive to the rectified DC line voltage provides for variable frequency operation in standby mode. The frequency output of the VCO is inversely proportional to the line voltage—as line voltage increases the switching frequency decreases, which decreases the output power.

14 Claims, 2 Drawing Sheets

LOW POWER DISSIPATION POWER SUPPLY AND CONTROLLER

This Application claims the benefit of U.S. Provisional Application Ser. No. 60/126,525 filed Mar. 26, 1999.

FIELD OF THE INVENTION

The invention relates generally to switched power supplies and more particularly to power supplies exhibiting low power dissipation in standby mode.

BACKGROUND

Regulated power supplies are found in virtually all electronic devices, including battery chargers, cellular telephones, computers, computer monitors, televisions, audio equipment, and video cameras. One typical power supply, the DC to DC converter, operates from a DC source, generates an alternating current as an intermediate process, and delivers direct current to a load. Switched DC converters, like linear, transformer-based power supplies, deliver a regulated output and provide isolation between input and output circuits. Unlike a linear power supply, however, the transformers in a switched DC converter operate at much higher frequencies, as high as several megahertz. This permits the use of small components, including transformers and capacitors, while still providing for complete isolation between the input and the output.

The recent demand for efficient power supplies in consumer electronic equipment has resulted in various improvements to the basic DC converter design. For example, television and computer monitors typically include power supplies capable of operating in multiple modes. A switched DC converter operating in standby mode switches at a fixed lower frequency and dissipates less power than a converter operating in a run mode. In standby mode, only the essential devices, such as microprocessors or microcontrollers, are powered.

Known designs and techniques for multi-mode power supplies are inadequate to achieve the low power dissipation requirements of modern consumer electronics. The inadequacies of current designs are magnified when the power supply must operate over a wide range of line voltages and must provide a wide range of output voltages. Modern televisions, for example, require power supplies operable from line voltages ranging from approximately 85 VRMS to 260 VRMS, and operable to deliver regulated outputs from 5 volts to 133 volts. In standby mode, power supplies will be required to dissipate less than 2 watts. Current designs cannot cost-effectively meet these voltage range requirements while achieving acceptably low power dissipation.

SUMMARY OF THE INVENTION

A power supply according to the principles of the invention operates over a wide range of line voltages and delivers a wide range of regulated outputs, while achieving lower power dissipation in standby mode than known power supplies. Low power dissipation in standby mode is achieved by disabling a start-up circuit, and by implementing variable frequency operation independent of the feedback signal. The start-up circuit provides power to the controller until feedback regulation enables. Once the start time expires, the start-up circuit is disabled so that it does not dissipate significant power. A standby mode detection circuit automatically implements the variable frequency operation. In standby mode, where power dissipation requirements can be less than two watts, disabling the start-up circuit and implementing variable frequency operation provides for significant power dissipation reduction.

A voltage controlled oscillator responsive to the rectified DC line voltage provides for the variable frequency operation in standby mode. The frequency output of the VCO is inversely proportional to the line voltage—as line voltage increases the switching frequency decreases, which decreases the output power. Since the VCO is responsive to the line voltage, no feedback signal is required. The circuit minimizes power dissipation by reducing switching loss in the power switch and by adjusting output power without dissipating power in the feedback circuits. The standby mode detection circuit controls whether the VCO or the feedback circuit controls switching frequency.

BRIEF DESCRIPTION OF THE DRAWINGS

A more complete understanding of the present invention may be obtained from consideration of the following description in conjunction with the drawings in which.

DETAILED DESCRIPTION

A power supply according to the principles of the invention provides for high efficiency, dual mode operation, and low power dissipation is standby mode. The power supply is suitable for use with various electronic devices, including televisions, computer monitors, personal computers, cellular telephones, communications equipment, audio equipment, radar and other like equipment. This description sets forth an exemplary embodiment of a hard-switching, current mode controlled power supply according to the principles of the invention. It should be apparent to one of ordinary skill in the art, however, that the invention can be used in other power supplies, such as soft-switching power supplies, implementing various control schemes, including voltage mode control.

A. Hard Switching Power Supply

Figure 1:
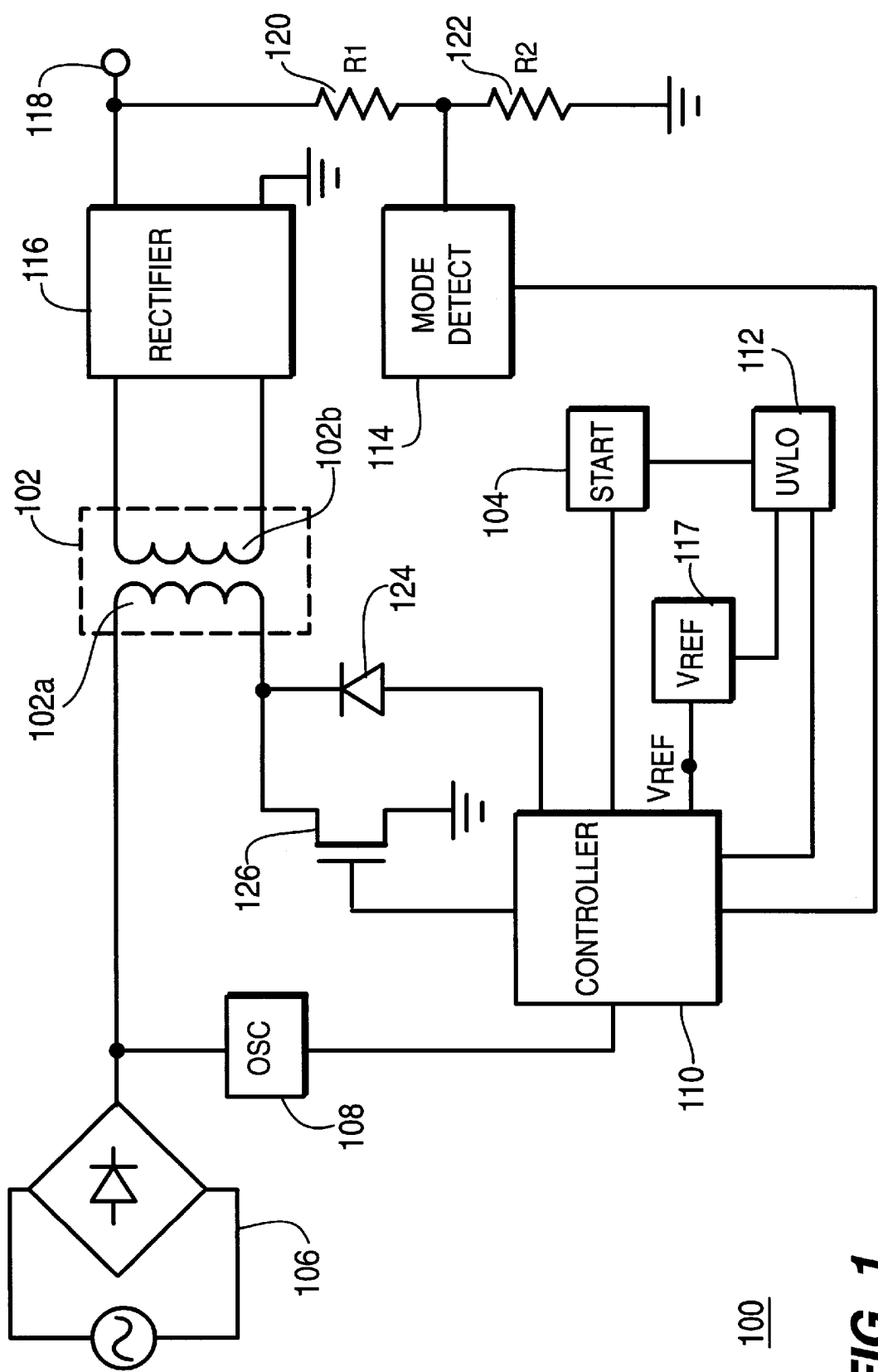
FIG. 1 shows a block diagram of a power supply according to the principles of the invention.

A power supply 100 according to the principles of the invention is shown FIG. 1. This hard-switching power supply 100 provides for dual mode operation, current mode control and low power dissipation. The power supply primary includes a voltage source 106, the primary 102a of a two winding transformer 102, a controller 110, a power switch 126, a start-up circuit 104, a reference voltage generator 117, and an oscillator 108 operable as a voltage controlled oscillator. On the secondary side, the power supply 100 includes a rectifier 116, resistors R1 120 and R2 122, a mode detection circuit 114, and the transformer secondary 102b. An under voltage lockout circuit 112 is also provided. The voltage supply and bias voltages for the various functional blocks are not shown.

When the voltage source 106 turns on, the oscillator 108 drives devices (not shown) in the controllers 110 for developing a switch signal. Devices and techniques for developing switch signals in controllers are known in the art. The UVLO 112 senses the reference voltage signal, Vref, and inhibits the controller 110 until Vref stabilizes. Vref is a reference voltage utilized by the controller 110 for developing, among other signals, the switch signal for the power switch 126. The start-up circuit 104 develops power for the controller until UVLO 112 senses a stable Vref, signals the controller 110 to operate, and signals the start-up circuit 104 to disable. A voltage is developed by the voltage divider R1/R2 (120 and 122, respectively), which is sensed by the mode detection circuit 114. Depending upon this voltage, the mode detection circuit 114 selects either a run mode or a standby mode for the power supply 100.

In the run mode, the load requirements are within normal operating range and the controller 110 implements PWM control of the switching frequency for the power switch 126. The PWM signal is developed from a current through the commutating diode 124, and causes a variable switch frequency signal to be applied to the power switch 126.

In the standby mode, current mode control disables and the oscillator 108 operates as a voltage controlled oscillator (VCO). The VCO 108 output is a signal having a frequency inversely proportional to the source voltage 106. If the source voltage increases, the frequency of the VCO output signal decreases. On the other hand, if the source voltage decreases, the VCO output signal frequency increases. The controller 110 develops the switch signal from the VCO output and adjusts the output power as a function of the source voltage 106. No current or voltage feedback is used in standby mode.

This exemplary power supply 100 minimizes power dissipation in the run mode and in the standby mode. Disabling the start-up circuit 104 once the controller 110 is operational reduces power dissipation in this circuit 104 in both run and standby modes. Likewise, disabling feedback control in the standby mode reduces switching loss in the main power switch, and adjusts output power in relation to the line voltage. VCO operation significantly reduces power dissipation over typical feedback control operation in standby mode.

The topology, devices and functional blocks of FIG. 1 are merely exemplary and that low power dissipation according to the principles of the invention can be used with a variety power supplies. For example, the start-up circuit disable and the VCO control with feedback disable can be implemented in soft-switching supplies, resonant mode supplies, variable pulse width supplies and other supplies relying on switching of an energy storage device. Similarly, the energy storage device can include inductors, capacitors or any energy storage device appropriate for power supply applications, and functions, such as the oscillator 108, UVLO 112 and mode detection 114, can be implemented in the controller 110.

Figure 2:
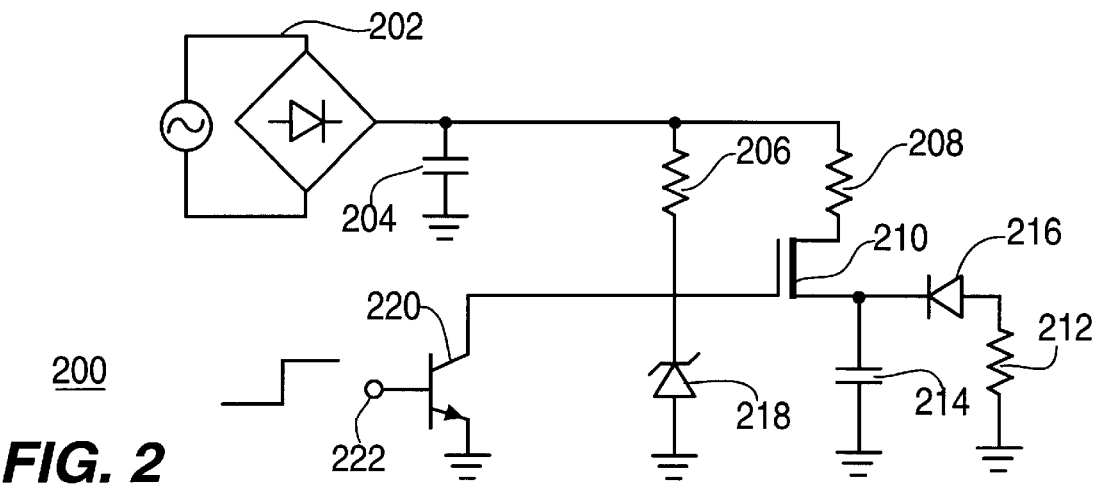
FIG. 2 shows a start-up and disable circuit according to the principles of the invention.

In FIG. 2 a start-up circuit 200 according to the principles of the invention is shown. This circuit 200 supplies the controller 110 of FIG. 1 for a fixed time or until the reference voltages in the controller 110 stabilize. The circuit 200 includes a disable switch transistor 220 and a startup switch transistor 210, a zener diode 218, an input capacitor 204, a start-up resistor 208, a startup capacitor 214, a source resistor 206 and a blocking diode 216. In a power supply start-up sequence, the voltage source 202 applies power to the start-up circuit 200, and the gate voltage of the start-up switch transistor 210 is the zener diode 218 breakdown voltage. In this exemplary circuit, the transistor 210 is of the FET type. The FET 210 is on when its gate is at the zener voltage, and the voltage source 202 begins to charge the start-up capacitor 214 through the startup resistor 208. Power to the controller (not shown) is delivered from the inductor 212, which discharges through the blocking diode 216.

The start-up sequence terminates when the disable switch transistor 220 turns on, which in normal operation, occurs when the reference and bias voltages stabilize and the controller enables. In the example of FIG. 1, the UVLO circuit 112 senses the reference and bias voltages and enables the controller 110. The same signal (or a similar signal) can be used to turn on the transistor 220. This switching action electrically bypasses the zener diode 218, and turns off the FET 210. No current runs through the source and drain of the FET 210, and the start-up resistor 208 is therefore disabled from the circuit. It dissipates little or no power. For further power dissipation reduction, the source resisitor 206 is chosen very large (several megaohms) so that the current draw is very small once the controller enables. If the transistor 222 does not turn on (the controller fails to enable), the start-up circuit terminates when the RC time constant of the start-up resistor 208 and the start-up capacitor 214 expires.

Figure 3:
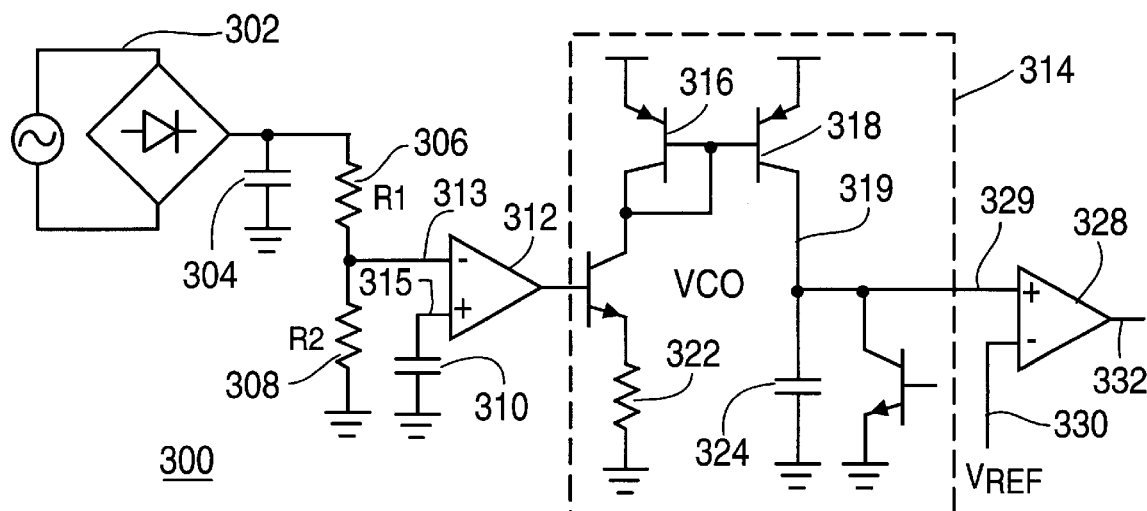
FIG. 3 shows an exemplary switch frequency control circuit.

An exemplary variable frequency circuit for use in the circuit of FIG. 1 is shown in FIG. 3. This circuit 300 consists of an input stage and an oscillation stage. The input stage includes an input capacitor 304, two resistors configured as a voltage divider (306 and 308), and an amplifier 312. The oscillator stage is a VCO 314 driven by the amplifier 312 of the input stage. The frequency resistor 322 and the frequency capacitor 324 set the time constant for the oscillation frequency, and the differential voltage of the amplifier 312 varies the VCO frequency.

Operation is like this: A voltage source 302 (rectified line voltage) is filtered by the input capacitor 304 and divided across R1 306 and R2 308. The divided voltage is applied to the inverting input 313 of the amplifier 312. The noninverting input 315 is coupled to a bias 310. The difference sets the VCO output frequency, which outputs a ramp signal, at 329. A comparator 328 coupled to the VCO output 329 and a reference voltage 330 provide a variable frequency, fixed pulse width signal, at 332, for driving a power switch, such as the switch 126 of FIG. 1.

This circuit 300 is enabled in the standby mode of operation. In standby mode, the required output supplies, for example, microprocessors or microcontrollers. In some applications, such as televisions, voltage and power requirements can be less than 5 volts at less than 3 watts in standby mode. Since the switch signal in standby mode is a fixed pulse width signal having a frequency inversely proportional to the line voltage, the output is sufficiently regulated for powering ICs and other low power devices. Power dissipation is reduced because the controller does not utilize feedback to control the output voltages, and the VCO controlled operation reduces switching losses in the main power switch.

Figure 4:
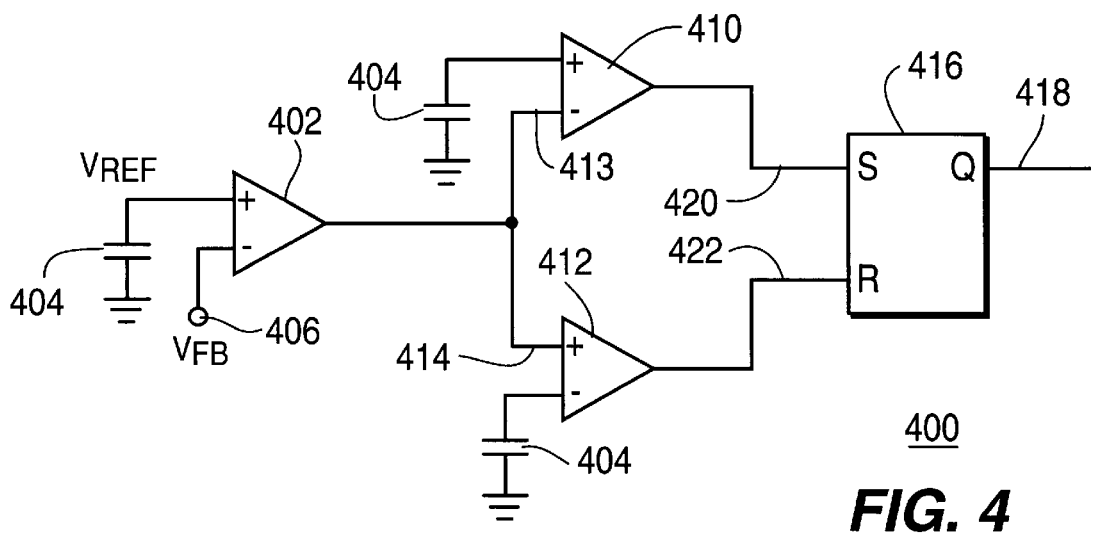
FIG. 4 shows an exemplary mode detection circuit.

FIG. 4 shows an exemplary stand-by mode detection circuit 400 that can be used with the power supply 100 of FIG. 1. The circuit 400 has a comparator 402 for comparing a feedback voltage 406 to a reference voltage 404. The comparator 402 outputs to a comparator 410 coupled to the S input 420 of an RS flip-flop 416 and to a comparator 412 coupled to the R input 422 of the flip-flop 416. When the feedback signal 406 indicates that the power supply output voltage exceeds or is less than a certain threshold, the flip-flop 416 outputs a signal, at 418, causing the controller 110 to operate in standby mode. In this mode, the variable frequency oscillator 108 shown in the power supply of FIG. 1 controls the switching frequency. When the flip-flop 416 output is low, the switching frequency is fixed by PWM control.

It is to be understood that the invention is not limited to the illustrated and described forms of the invention contained herein. It will be apparent to those skilled in the art that various changes may be made without departing from the scope of the invention, and the invention is not considered limited to what is shown in the drawings and described in the specification. For example, as is known in the art, noise caused by parasitic capacitences in switching MOSFETS can be reduced with blanking pulses. Also, variable frequency control as a function of line voltage can be used in various types of power supplies, since the feedback scheme is disabled. Likewise, other devices and switch schemes can be used to disable power dissipating devices in the start-up circuit. These and other additions or changes can be used in a power supply without departing from the invention.

What is claimed is:

1. A switched power supply comprising:
    a controller for providing feedback control when the power supply is in a run mode and for providing feedback independent control when the power supply is in a standby mode; and
    a mode detection circuit operable to select at least one of the standby mode or the run mode.

2. The power supply of claim 1 further comprising:
    a start-up circuit responsive to an input voltage and operable to power the controller for a programmable time;
    a disable circuit operable to disable the start-up circuit when the feedback control enables; and
    a variable frequency oscillator responsive to the input voltage for providing a switching signal to the controller when the power supply is in the standby mode.

3. The power supply of claim 1 wherein the power supply is one selected from the group comprising a hard switching power supply, a soft switching power supply and resonant mode power supply.

4. The power supply of claim 1 wherein the controller is a current mode controller.

5. The power supply of claim 1 wherein the controller is a voltage mode controller.

6. The power supply of claim 2 wherein the disable circuit includes:
    a first switch having at least three terminals and responsive to a first signal, the first terminal and the second terminal operable to conduct when the first signal is at a threshold and the second terminal and the third terminal operable to conduct when the first signal is below the threshold;
    a threshold device for maintaining the first signal at the threshold;
    a power dissipating device serially connected between the input voltage and the first terminal; and
    a second switch operable to turn-off the threshold device when the feedback control enables, wherein the power dissipating device is disabled.

7. The power supply of claim 6 wherein the power dissipating device is a start-up resistor, the circuit further including a capacitor serially connected to the third terminal, the start-up resistor and the capacitor providing the programmable time.

8. The power supply of claim 6 further including an energy storage device responsive to the input voltage for delivering power to the controller during a power supply start-up.

9. The power supply of claim 8 wherein the energy storage device is an inductor.

10. The power supply of claim 2 wherein the variable frequency oscillator is a voltage controlled oscillator for providing the switching signal at a frequency inversely proportional to the input voltage.

11. The power supply of claim 1 wherein the mode detection circuit includes:
    a first comparator responsive to a reference voltage and a feedback signal;
    a second comparator having an inverting input connected to an output of the first comparator and a noninverting input connected to a reference;
    a third comparator having a noninverting input connected to the output of the first comparator and an inverting input connected to the output of the first comparator; and
    an RS flip-flop having an R input and an S input, the R input coupled to an output of the second comparator and the S input coupled to an output of the third comparator.

12. An electronic device comprising a power supply according to claim 1.

13. The electronic device of claim 12 wherein the electronic device is one selected from the group comprising a television, a monitor, a computer, a phone, and an audio device.

14. A method for operating a switching power supply having a controller for controlling a switch signal, the steps comprising:
    powering the controller from a start-up circuit for a programmable time;
    disabling the start-up circuit when an output control is enabled;
    selecting a standby mode when a required output is less than a threshold; and
    varying a switching frequency in inverse proportion to the input voltage when the standby mode is selected,
    wherein the step of varying the switching frequency includes the step of disabling feedback control and controlling an oscillator with an input voltage, the oscillator operable to cause the controller to set the switching frequency.

* * * * *